United States Patent
Cheng et al.

(10) Patent No.: US 9,519,573 B2
(45) Date of Patent: *Dec. 13, 2016

(54) CREATING A SOFTWARE PERFORMANCE TESTING ENVIRONMENT ON A VIRTUAL MACHINE SYSTEM

(71) Applicant: International Business Machines Corporation, Armonk, NY (US)

(72) Inventors: Xin Hao Cheng, Shanghai (CN); Guo Qiang Hu, Shanghai (CN); Jun Chi Yan, Shanghai (CN); Jun Zhu, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/747,703

(22) Filed: Jun. 23, 2015

(65) Prior Publication Data

US 2015/0293836 A1    Oct. 15, 2015

Related U.S. Application Data

(63) Continuation of application No. 14/674,619, filed on Mar. 31, 2015.

(30) Foreign Application Priority Data

Mar. 31, 2014  (CN) .......................... 2014 1 0127561

(51) Int. Cl.
*G06F 9/46*    (2006.01)
*G06F 9/455*    (2006.01)
(Continued)

(52) U.S. Cl.
CPC ......... *G06F 11/3688* (2013.01); *G06F 3/0601* (2013.01); *G06F 9/45533* (2013.01);
(Continued)

(58) Field of Classification Search
None
See application file for complete search history.

(56) References Cited

U.S. PATENT DOCUMENTS 8,069,372 B2    11/2011  Natvig
2007/0226449 A1*    9/2007  Akimoto ............... G06F 9/5077
                                                          711/170
(Continued)

FOREIGN PATENT DOCUMENTS

WO    WO2008/027831 A2    3/2008

OTHER PUBLICATIONS

Kim et al., "Software Performance Test Automation by Using the Virtualization," IT Convergence and Security 2012, Lecture Notes in Electrical Engineering, vol. 215, 2013, Date: Dec. 11, 2012, springer.com/chapter/10.1007/978-94-007-5860-5_143, Abstract Only.

(Continued)

*Primary Examiner* — Bing Zhao
(74) *Attorney, Agent, or Firm* — Scully, Scott, Murphy & Presser, P.C.; David M. Quinn, Esq.

(57) ABSTRACT

A method for creating a software performance testing environment based on a virtual machine, wherein the method comprises: in response to obtaining a hard disk read/write request triggered by a virtual CPU of the virtual machine, notifying a virtual CPU scheduler to record a CPU time quota t1 already consumed by the virtual CPU in a current CPU schedule period; in response to detecting completion of hard disk read/write processing corresponding to the hard disk read/write request, predicting a hard disk read/write latency t corresponding to the hard disk read/write request in a target environment; notifying the virtual CPU scheduler to determine a CPU time quota already consumed by the virtual CPU in the current CPU schedule period based on the recorded CPU time quota t1 and the hard disk read/write (Continued)

latency t; and adjusting a system clock of the virtual machine based on the determined CPU time quota already consumed by the virtual CPU in the current CPU schedule period. The method may obtain, in the created software performance testing environment, a software performance testing result consistent with the result obtained under a highly configured server in the target environment.

8 Claims, 7 Drawing Sheets

(51) Int. Cl.
  *G06F 13/00* (2006.01)
  *G06F 15/173* (2006.01)
  *G06F 11/36* (2006.01)
  *G06F 9/48* (2006.01)
  *G06F 11/34* (2006.01)
  *G06F 3/06* (2006.01)

(52) U.S. Cl.
  CPC ........ *G06F 9/45558* (2013.01); *G06F 9/4881* (2013.01); *G06F 9/4887* (2013.01); *G06F 11/3466* (2013.01); *G06F 11/3664* (2013.01); *G06F 2009/45591* (2013.01)

(56) References Cited

U.S. PATENT DOCUMENTS

| | | |
|---|---|---|
| 2009/0088884 A1 | 4/2009 | Yuan et al. |
| 2013/0024729 A1 | 1/2013 | Salloum et al. |
| 2013/0055250 A1 | 2/2013 | Pechanee et al. |
| 2014/0089509 A1* | 3/2014 | Akolkar ................ H04L 41/147 709/226 |

OTHER PUBLICATIONS

Kim et al., "Software Performance Testing Scheme Using Virtualization Technology," ICUT '09, Proceedings of the 4th International Conference on Ubiquitous Information Technologies & Applications, 2009. ieeexplore.ieee.org/xpl/login.jsp?tp=&arnumber=5405721&url=http%3A%2F%2Fieeexplore.ieee.org%2Fxpls%2Fabs_all.jsp%3Farnumber%3D5405721 , Dec. 20-22, 2009, Abstract Only.

"Shunra Works With HP to Extend Mobile Application Performance Testing" Press Release, Reuters, Oct. 16, 2012, http://www.shundra.com/products/shunra-network-virtualization, .reuters.com/article/2012/10/16/idUS157588+16-Oct-2012+BW20121016.

"New! Application Performance Testing in a Virtual Environment," Free Network Virtualization Trial, Virtualization Software Trial, HP Official Site, .shunra.com/shunrablog/index.php/2010/06/07/new-application-performance-testing-in-a-virtual-environment/, last downloaded Mar. 31, 2015.

\* cited by examiner

CREATING A SOFTWARE PERFORMANCE TESTING ENVIRONMENT ON A VIRTUAL MACHINE SYSTEM

CROSS REFERENCE TO RELATED APPLICATION

This application is a continuation of U.S. patent application Ser. No. 14/674,619, filed Mar. 31, 2015 the entire content and disclosure of which is incorporated herein by reference.

FIELD OF THE INVENTION

The present invention relates to a virtual machine, and more specifically, to a method and apparatus for creating a software performance testing environment based on a virtual machine.

BACKGROUND

Software performance testing is an important part for software quality control. In a standard software development flow, each software version has to go through several rounds of performance testing before its release or delivery to a client, so as to guarantee that the software can run normally in the operating environment after delivery. Reliable software performance testing requires consistency between the hardware environment for the testing and the hardware environment where the software is finally deployed for operation. However, in most cases, the target hardware performance of a software product is relatively high, and the hardware environment of the existing software testing platform of a software developer (or software delivering party) always cannot reach such a requirement, while purchasing new hardware devices is restricted by both funds and purchase time. In the practice of software performance testing, the above problem is mainly solved by comprehensively utilizing the approaches of real testing and prediction. In other words, meticulous software performance testing is performed in an existing test environment with a relatively lower hardware performance, and based on the resulting testing result, software performance in a high performance target hardware environment may be predicted. However, this method has drawbacks in the following three aspects: 1. the real testing needs more test cases; 2. the quality of prediction is especially dependent on the experience and expertise of testing staff; 3. in view of the inherent uncertainty of the prediction per se, a conservative performance estimation is always adopted in performance prediction, which leads to an inaccurate performance evaluation, causing extra software development costs or software operating costs.

In recent years, the computer application field witnesses an upsurge of virtual machines and virtualization technology. For virtual machines, the virtualization technology is an integration of technologies of designing virtual computers. The virtualization technology may expand hardware capacity and simplify software re-configuration process. For example, the CPU virtualization technology may emulate a multi-CPU parallel operation using a single CPU and allow running a plurality of operating systems on one platform simultaneously; besides, application programs may run within mutually independent spaces without affecting one another. In this way, working efficiency of a computer can be significantly improved. The existing virtual machine technology may functionally emulate a high performance server on a relatively low performance server. However, such a virtual machine can not provide the operating performance of a real high performance server. Therefore, it cannot be used for software performance testing. In consideration of the extra system overheads of running a virtual environment, software performance testing also expects a hardware environment with performance higher than the target environment. However, this will cause extra software development costs to purchase different hardware devices corresponding to different target hardware environments.

Therefore, there is a need for a method for creating a software performance testing environment based on a virtual machine.

SUMMARY

According to one aspect of the present invention, there is provided a method for creating a software performance testing environment based on a virtual machine, comprising: in response to obtaining a hard disk read/write request triggered by a virtual CPU of the virtual machine, notifying a virtual CPU scheduler to record a CPU time quota t1 already consumed by the virtual CPU in a current CPU schedule period; in response to detecting completion of hard disk read/write processing corresponding to the hard disk read/write request, predicting a hard disk read/write latency t corresponding to the hard disk read/write request in a target environment; notifying the virtual CPU scheduler to determine a CPU time quota already consumed by the virtual CPU in the current CPU schedule period based on the recorded CPU time quota t1 and the hard disk read/write latency t; and adjusting a system clock of the virtual machine based on the determined CPU time quota already consumed by the virtual CPU in the current CPU schedule period.

According to another aspect of the present invention, there is provided an apparatus for creating a software performance testing environment based on a virtual machine, comprising: a recording module configured to, in response to obtaining a hard disk read/write request from a disk manager, notify a virtual CPU scheduler to record a CPU time quota t1 already consumed by a virtual CPU issuing the hard disk read/write request in a current CPU schedule period; a predicting module configured to, in response to detecting completion of hard disk read/write processing corresponding to the hard disk read/write request, predict a hard disk read/write latency t corresponding to the hard disk read/write request in a target environment; a determining module configured to notify the virtual CPU scheduler to determine a CPU time quota already consumed by the virtual CPU in the current CPU schedule period based on the recorded CPU time quota t1 and the hard disk read/write latency t; and an adjusting module configured to adjust a system clock of the virtual machine based on the determined CPU time quota already consumed by the virtual CPU in the current CPU schedule period.

By virtue of the method and apparatus for creating a software performance testing environment based on a virtual machine according to the embodiments of the present invention, it is enabled to obtain, in the software performance testing environment created based on the virtual machine, a software performance testing result consistent with the result obtained under a highly configured server in a target environment.

BRIEF DESCRIPTION OF THE SEVERAL VIEWS OF THE DRAWINGS

Through more detailed description of exemplary embodiments of the present disclosure in conjunction with the accompanying drawings, the above and other objects, features and advantages of the present disclosure would become more apparent, wherein the same reference numeral generally refers to the same component in the exemplary embodiments of the present disclosure.

DETAILED DESCRIPTION

Some preferable embodiments would be described in more detail with reference to the accompanying drawings, in which the preferable embodiments of the present disclosure have been illustrated. However, it shall be understood that the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
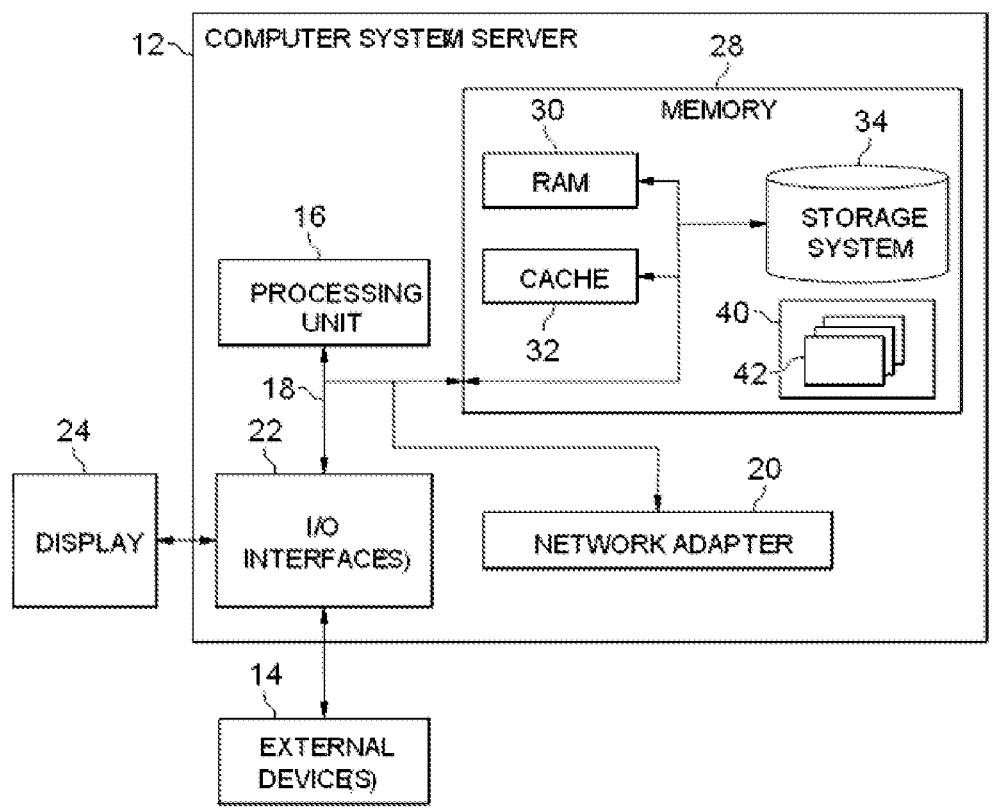
FIG. 1 shows a block diagram of an exemplary computer system/server 12 which is applicable to implement the embodiments of the present invention.

FIG. 1 shows a block diagram of an exemplary computer system/server 12 which is applicable to implement the embodiments of the present invention. The computer system/server 12 as shown in FIG. 1 is only an example, which should not construct any limitation to the functions and application scope of the embodiments of the present invention.

As shown in FIG. 1, the computer system/server 12 is embodied in the form of a general computing device. Components of the computer system/server 12 may comprise, but not limited to, one or more processors or processing units 16, a system memory 28, and a bus 18 connecting different system components (including the system memory 28 and the processing unit 16).

The system bus 18 indicates one or more of a plurality of bus structures, including a memory bus or a memory controller, a peripheral bus, a graphic acceleration port, a processor, or a local bus using any bus structure in the plurality of bus structures. For example, the above hierarchical structures include, but not limited to, an industrial standard architecture (ISA) bus, a MicroChannel Architecture (MAC) bus, an enhanced-ISA bus, a video electronic standard association (VESA) local bus, and a peripheral component interconnection (PCI) bus.

The computer system/server 12 typically comprises various kinds of computer system-readable mediums. These mediums may be any available mediums accessible by the computer system/server 12, comprising volatile and non-volatile mediums, mobile and non-mobile mediums.

The system memory 28 may comprise a computer system readable medium in a form of volatile memory, for example, a random access memory (RAM) 30 and/or a cache memory 32. The computer system/server 12 may further comprise other mobile/non-mobile, volatile/non-volatile computer system storage mediums. As an example, the memory system 34 may be used to read/write a non-mobile, non-volatile magnetic medium (not shown in FIG. 1, generally called "a hard disk driver"). Although not shown in FIG. 1, a magnetic disk driver for reading/writing a mobile, non-volatile magnetic disk (for example, a "floppy disk") and an optical disk driver for reading/writing a mobile, non-volatile optical disk (for example, CD-ROM, DVD-RON, or other optical medium) may be provided. In these cases, each driver may be connected to the bus 18 via one or more data medium interfaces. The memory 28 may comprise at least one program product that has a set (for example, at least one) program modules, and these program modules may be configured to perform the functions of various embodiments of the present invention.

A program/utility tool 40 comprising a set (at least one) of a program module 42 may be stored in for example the memory 28; such program module 42 comprises, but not limited to, an operating system, one or more applications, other program modules, and program data, and each of these examples or a certain combination thereof might comprise implementation of a network environment. The program module 42 generally executes the functions and/or methods in the embodiments as described according to the present invention.

The computer system/server 12 may also communicate with one or more peripheral devices 14 (for example, a keypad, a pointing device, a display 24, etc.), and may also communicate with one or more device that enable the user to interact with the computer system/server 12, and/or communicate with any device (for example, network card, modem, etc.) that enables the computer system/server 12 to communicate with one or more other computing devices. Such communication may be performed via an input/output (I/O) interface 22. Moreover, the computer system/server 12 may also communicate with one or more networks (for example, a local area network (LAN), a wide area network (WAN), and/or a public network, for example, Internet). As shown in the figure, a network adaptor 20 communicates with other modules of the computer system/server 12 via the bus 18. It should be appreciated that although not shown in the figure, other hardware and/or software modules may be used in combination with the computer system/server 12, including, but not limited to, micro-code, device driver, redundancy processing unit, external disk driving array, RAID system, magnetic tape driver, and a data backup storage system, etc.

Figure 2:
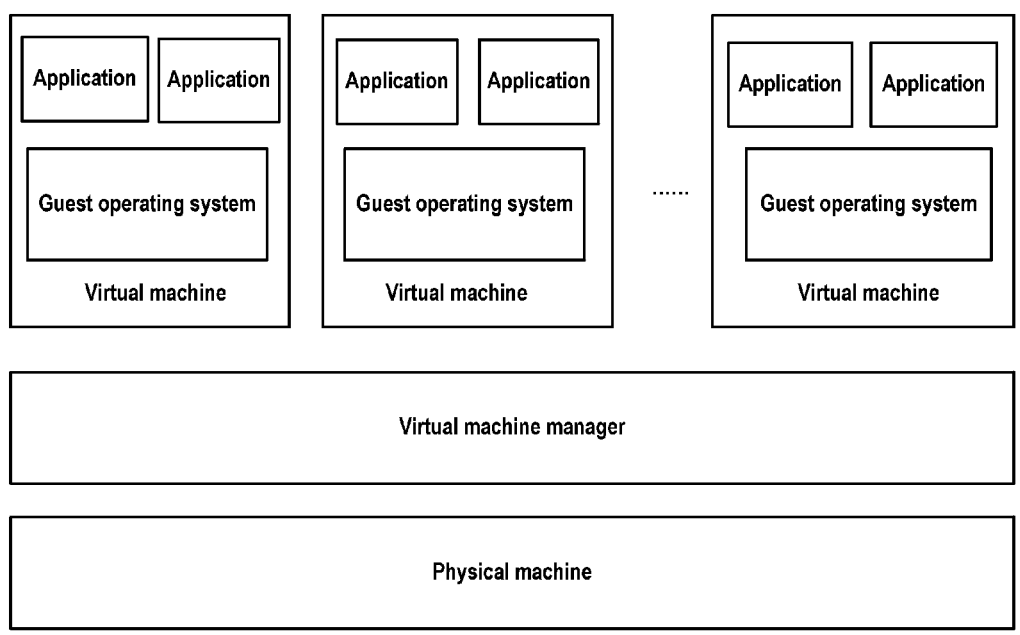
FIG. 2 shows a schematic diagram of a virtual machine system according to an embodiment of the present invention.

FIG. 2 shows a schematic diagram of a virtual machine system according to an embodiment of the present invention. The virtual machine system comprises a physical machine, a virtual machine manager (Hypervisor), and a plurality of virtual machines, wherein the virtual machine is a strictly separated software container, including a plurality of guest operating systems (guest OSs) and a plurality of applications running on each guest OS. The virtual machine system may have a plurality of virtual machines with different operating systems that run independently in parallel on the same physical machine, thereby sharing resources in a single physical machine among a plurality of virtual machines. The virtual machine manager (hypervisor) is a software layer for providing virtualization of a bottom layer machine, which runs on physical hardware, and realizes management and support of virtual machines on the bottom layer, so as to allocate hardware resources to the virtual machines in a dynamic and transparent manner. The virtual machine according to the embodiments of the present invention may run in a Java virtual machine (JVM) operating environment defined by Java standard specifications, or may be any kind of platform-independent virtual machine, e.g., C#, Smalltalk, Ruby, D language, nuva, but not limited to Java virtual machines. According to the embodiments of the present invention, a target hardware environment with the multi-CPU parallel operation is simulated on the physical machine of the virtual machine system; a plurality of guest operating systems run simultaneously on a plurality of virtual machines, and a plurality of application programs run on each guest operating system. A software performance testing environment is created on the virtual machine system so as to guarantee that the software can run normally in the target environment after delivery.

Figure 3:
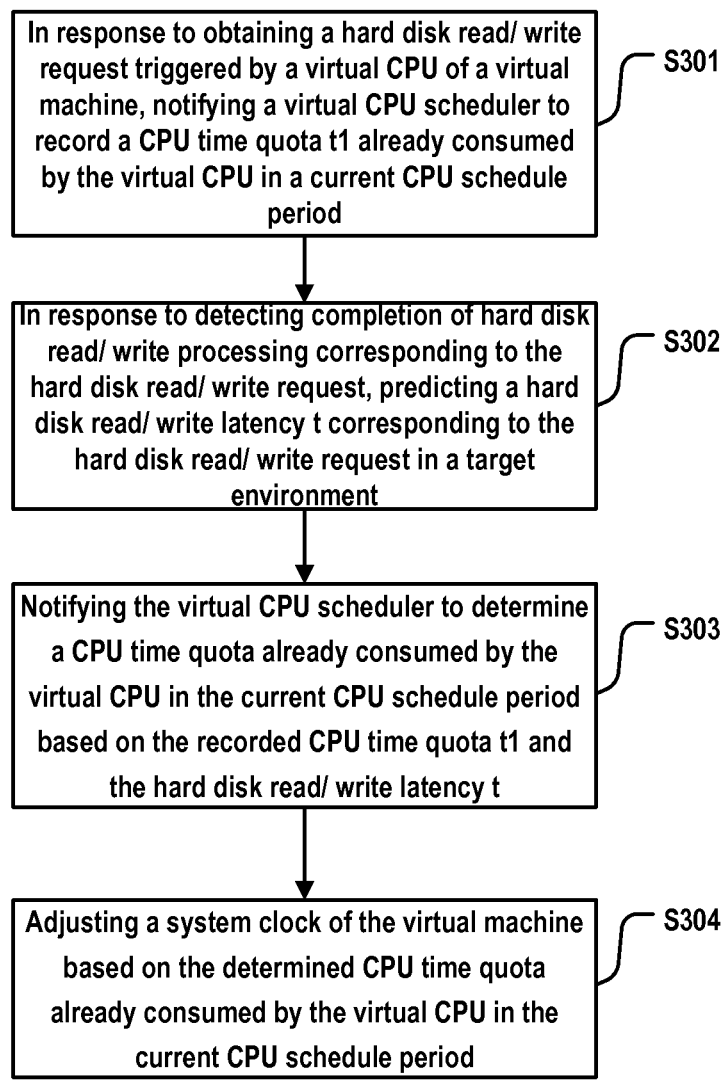
FIG. 3 shows a method for creating a software performance testing environment based on a virtual machine according to an embodiment of the present invention.

Now, reference is made to FIG. 3. FIG. 3 shows a method for creating a software performance testing environment based on a virtual machine according to an embodiment of the present invention, comprising: in step S301, in response to obtaining a hard disk read/write request triggered by a virtual CPU of a virtual machine, notifying a virtual CPU scheduler (vCPU scheduler) to record a CPU time quota t1 already consumed by the virtual CPU in a current CPU schedule period; in step S302, in response to detecting completion of hard disk read/write processing corresponding to the hard disk read/write request, predicting a hard disk read/write latency t corresponding to the hard disk read/write request in a target environment; in step S303, notifying the virtual CPU scheduler to determine a CPU time quota already consumed by the virtual CPU in the current CPU schedule period based on the recorded CPU time quota t1 and the hard disk read/write latency t; and in step 304, adjusting a system clock of the virtual machine based on the determined CPU time quota already consumed by the virtual CPU in the current CPU schedule period.

According to one embodiment of the present invention, said in response to detecting completion of hard disk read/write processing corresponding to the hard disk read/write request, predicting a hard disk read/write latency t corresponding to the hard disk read/write request in a target environment comprises: determining that the hard disk read/write request belongs to a hard disk read/write request that would not occur in the target environment, and predicting that, in the target environment, the hard disk read/write latency t corresponding to the hard disk read/write request is equal to 0.

According to one embodiment of the present invention, said in response to detecting completion of hard disk read/write processing corresponding to the hard disk read/write request, predicting a hard disk read/write latency t corresponding to the hard disk read/write request in a target environment comprises: determining that the hard disk read/write request belongs to a hard disk read/write request that would occur in the target environment, and predicting the hard disk read/write latency t corresponding to the hard disk read/write request in the target environment based on a time when the hard disk read/write processing is completed. In particular, the time $T_a$ when the hard disk read/write request is obtained may be recorded in step S301; and the time $T_b$ when the hard disk read/write processing is completed is recorded in step S302. The ratio k of the hard disk read/write speed of the server in the target environment to the hard disk read/write speed of the current physical machine where the virtual machine is located is obtained, thereby predicting the hard disk read/write latency $t=(T_b-T_a)/k$ corresponding to the hard disk read/write request in the target environment.

Figure 4:
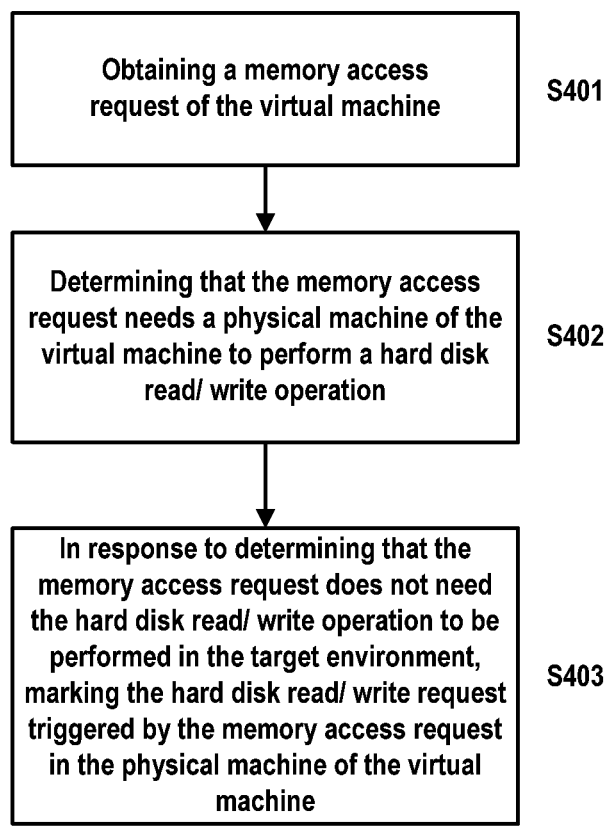
FIG. 4 shows a flowchart of determining that a hard disk read/write request belongs to a hard disk read/write request that would not occur in the target environment according to an embodiment of the present invention.

FIG. 4 shows a flowchart of determining that a hard disk read/write request belongs to a hard disk read/write request that would not occur in a target environment according to an embodiment of the present invention. In step S401, a memory access request of the virtual machine is obtained; in step S402, it is determined that the memory access request needs a physical machine for the virtual machine to perform a hard disk read/write operation. In particular, a virtual memory address of the content to be accessed is parsed out from the memory access request, and it is queried, in a virtual memory address mapping table maintained by a memory manager, whether the virtual memory address is mapped to the physical memory address of the virtual machine system. If the virtual memory address is not mapped to the physical memory address of the virtual machine system, it is determined that the memory access request needs the physical machine for the virtual machine to perform the hard disk read/write operation; in step S403, in response to determining that the memory access request does not need the hard disk read/write operation to be performed in the target environment, the hard disk read/write request triggered by the memory access request in the physical machine of the virtual machine is marked. In particular, the virtual memory address mapping table of the target environment is maintained in the virtual machine manager, and in the virtual memory address mapping table of the target environment, it is queried whether the virtual memory address is mapped to the physical memory address of the target environment. If the virtual memory address is not mapped to the physical memory address of the target environment, it is determined that the memory access request does not need the hard disk read/write operation to be performed in the target environment. In addition to the above marked hard disk read/write request triggered by the memory access request, other unmarked hard disk read/write requests, on one hand, may come from the hard disk read/write requests that also need the hard disk read/write operation to be performed in the target environment among the hard disk read/write requests triggered by the memory access request in the physical machine for the virtual machine and, on the other hand, may also directly come from hard disk read/write requests of the application programs on the virtual machine, which would not be distinguished herein. As long as a hard disk read/write request is not marked, it would be classified as belonging to the hard disk read/write request that would occur in the target environment.

Figure 5:
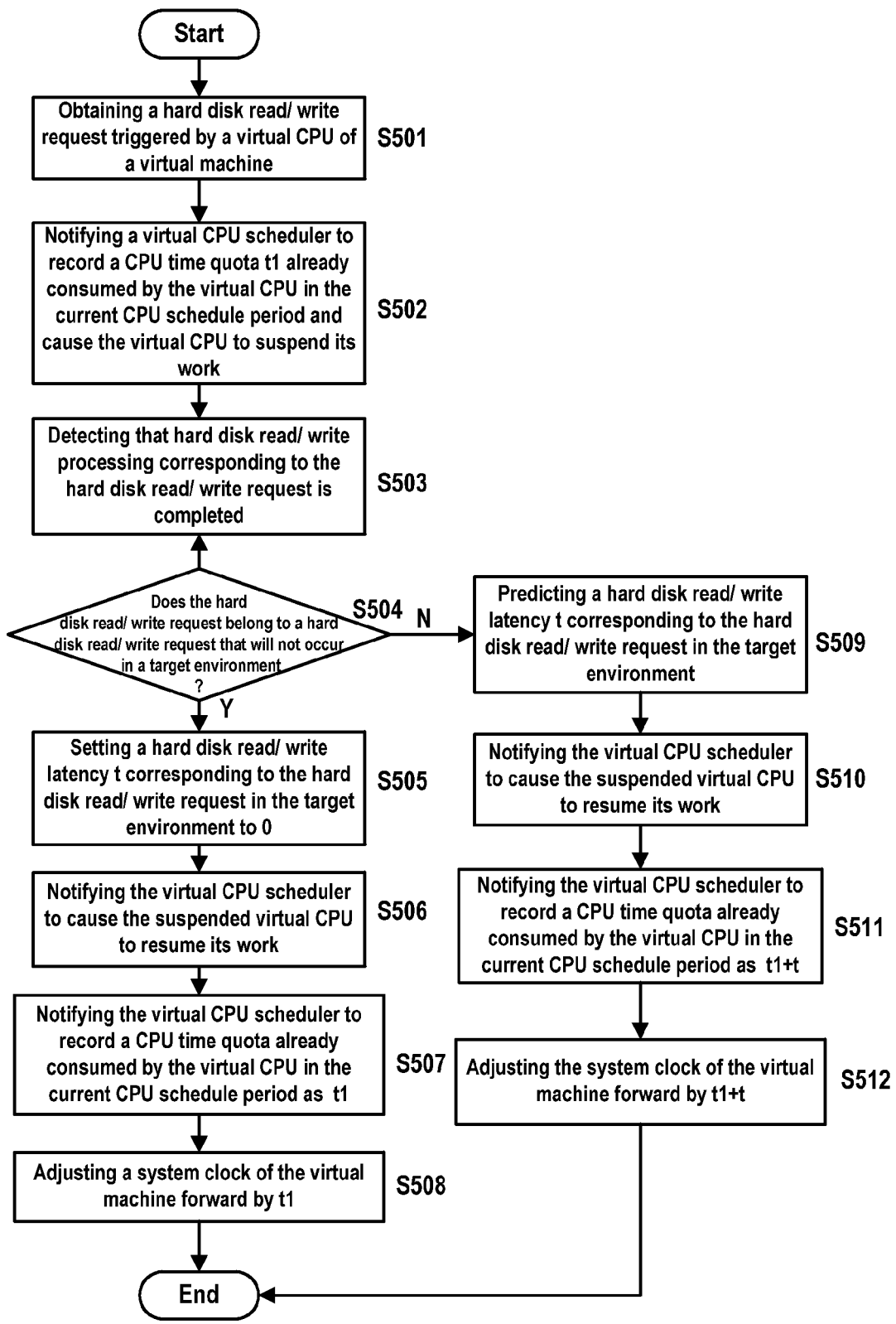
FIG. 5 shows a flowchart of creating a software performance testing environment based on a virtual machine according to an embodiment of the present invention.

FIG. 5 shows a flowchart of creating a software performance testing environment based on a virtual machine according to one embodiment of the present invention. In step S501, a hard disk read/write request triggered by a virtual CPU of a virtual machine is obtained; in step S502, a virtual CPU scheduler is notified to record a CPU time quota t1 already consumed by the virtual CPU in the current CPU schedule period and cause the virtual CPU to suspend its work; in step S503, it is detected that hard disk read/write processing corresponding to the hard disk read/write request is completed; in step S504, it is determined whether the hard disk read/write request belongs to a hard disk read/write request that would not occur in a target environment; if a result of the determining is "yes," then in step S505, a hard disk read/write latency corresponding to the hard disk read/write request in the target environment is set to 0; in step S506, the virtual CPU scheduler is notified to cause the suspended virtual CPU to resume its work; in step S507, the virtual CPU scheduler is notified to record a CPU time quota already consumed by the virtual CPU in the current CPU schedule period as t1; in step S508, a system clock of the virtual machine is adjusted forward by t1. The flow ends. If the result of the determining is "No," in step S509, the hard disk read/write latency t corresponding to the hard disk read/write request in the target environment is predicted. Its specific implementation may be referred to the above description, which would not be detailed herein. In step S510, the virtual CPU scheduler is notified to cause the suspended virtual CPU to resume its work; in step S511, the virtual CPU scheduler is notified to record a CPU time quota already consumed by the virtual CPU in the current CPU schedule period as t1+t; in step S512, the system clock of the virtual machine is adjusted forward by t1+t. The flow ends. The execution order of the determining step S504 is not fixed, which may be performed after step S501 and before S502, or performed after step S502 and before step S503.

Figure 6:
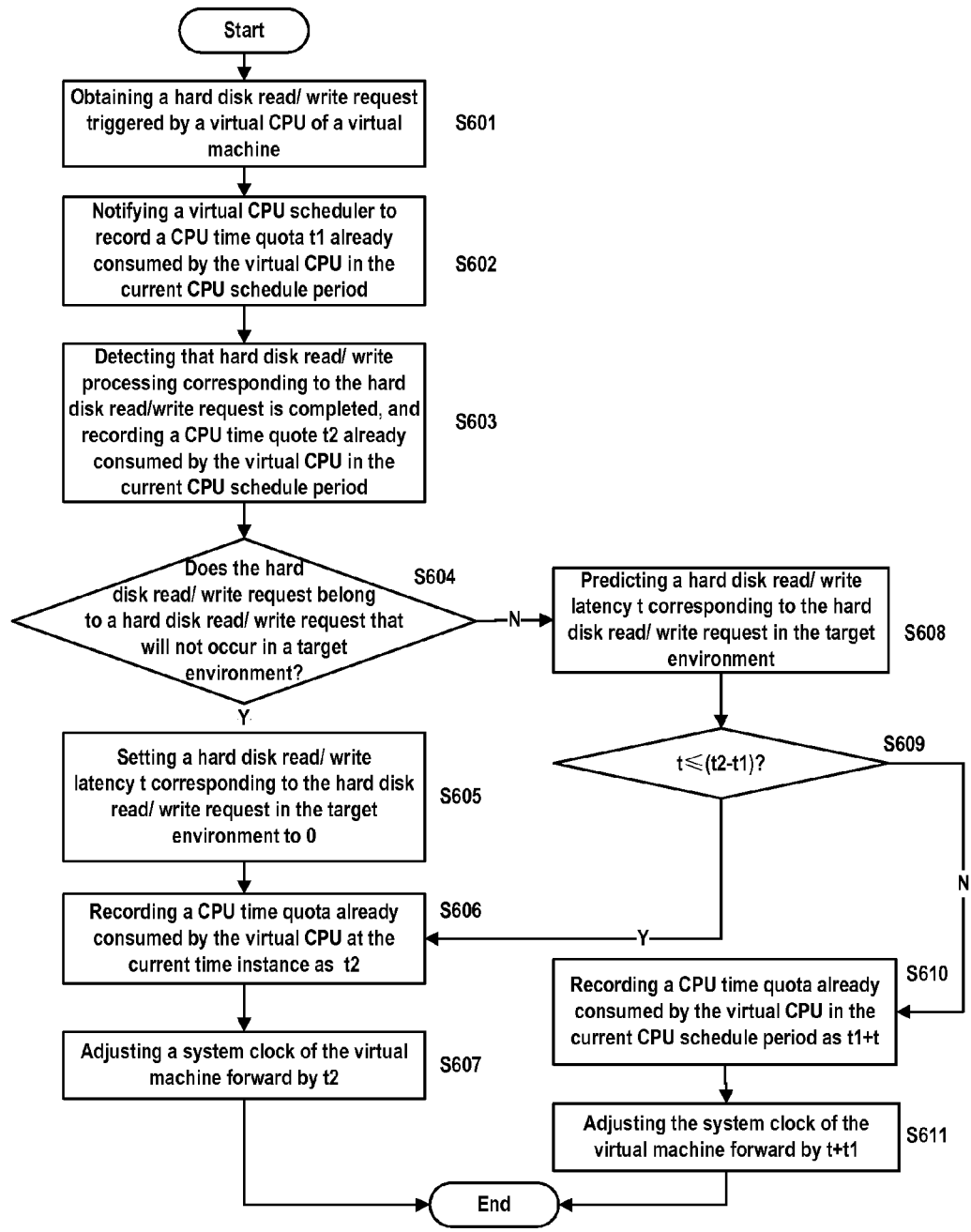
FIG. 6 shows a flowchart of creating a software performance testing environment based on a virtual machine according to another embodiment of the present invention.

FIG. 6 shows a flowchart of creating a software performance testing environment based on a virtual machine according to another embodiment of the present invention. In step S601, a hard disk read/write request triggered by a virtual CPU of the virtual machine is obtained; in step S602, a virtual CPU scheduler is notified to record a CPU time quota t1 already consumed by the virtual CPU in the current CPU schedule period; in step S603, it is detected that hard disk read/write processing corresponding to the hard disk read/write request is completed, and a CPU time quote t2 already consumed by the virtual CPU in the current CPU schedule period is recorded; in step S604, it is determined whether the hard disk read/write request belongs to a hard disk read/write request that would not occur in a target environment; if a result of the determining is "yes," in step S605, a hard disk read/write latency t corresponding to the hard disk read/write request in the target environment is set to 0; in step S606, the virtual CPU scheduler is notified to record a CPU time quota already consumed by the virtual CPU in the current CPU schedule period as t2; in step S607, a system clock of the virtual machine is adjusted forward by t2. Then, the flow ends. If the result of the determining is "No," in step S608, the hard disk read/write latency t corresponding to the hard disk read/write request in the target environment is predicted. Its specific implementation may be referred to the above description, which will not be detailed herein. In step S609, it is determined whether t is less than or equal to (t2−t1). If the result of the determining is "yes," the flow then proceeds to step S606; if the result of the determining is "no," i.e., t is greater than (t2−t1), then in step S610, the virtual CPU scheduler records a CPU time quota already consumed by the virtual CPU in the current CPU schedule period as t1+t; and in step S611, the system clock of the virtual machine is adjusted forward by t1+t. The flow ends. The execution order of the determining step S604 is not fixed, which may be performed after step S601 and before S602, or performed after step S602 and before step S603.

For steps S508, S512, S608, and S612 of adjusting the system clock in FIGS. 5 and 6, the time point for system clock adjustment may be determined based on specific implementations, which is not limited here. For example, the system clock may be adjusted at an interval between two CPU schedule periods, or adjusted at a certain time point within the CPU schedule period.

Since the software performance testing index is closely associated with a task processing delay, reasonable control of the system clock of the virtual machine can obtain, in the created low configured software testing environment, a software performance testing result consistent with the result under a highly configured server in the target environment, which saves the costs for software testing. The implementation logic for the embodiment of FIG. 5 is simple, while the test result for the embodiment of FIG. 6 is more accurate.

Various embodiments of implementing the method of the present invention have been described above with reference to the drawings. Those skilled in the art would appreciate that the above method may be implemented by software in a virtual machine manager or by hardware in the virtual machine manager, or by a combination of software and hardware. Moreover, those skilled in the art would appreciate that by performing various steps in the above method by software, hardware or a combination of hardware or software, an apparatus for creating a software performance testing environment based on a virtual machine may be provided. Even if the present apparatus is identical to a general-purpose processing apparatus in the hardware structure, due to the role played by the software therein, the present apparatus exhibits a characteristic distinguishable from the general-purpose processing apparatus, which thereby forms the apparatus according to various embodiments of the present invention.

Figure 7:
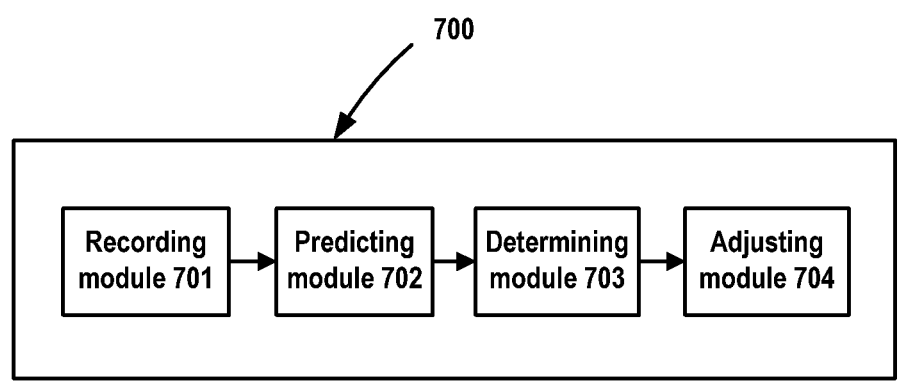
FIG. 7 shows an apparatus 700 for creating a software performance testing environment based on a virtual machine according to an embodiment of the present invention.

Based on the same inventive concept, the present invention further provides an apparatus for creating a software performance testing environment based on a virtual machine. FIG. 7 shows an apparatus 700 for creating a software performance testing environment based on a virtual machine according to an embodiment of the present invention, comprising: a recording module 701 configured to, in response to obtaining a hard disk read/write request from a disk manager, notify a virtual CPU scheduler to record a CPU time quota t1 already consumed by a virtual CPU of the virtual machine issuing the hard disk read/write request in a current CPU schedule period; a predicting module 702 configured to, in response to detecting completion of hard disk read/write processing corresponding to the hard disk read/write request, predict a hard disk read/write latency t corresponding to the hard disk read/write request in a target environment; a determining module 703 configured to notify the virtual CPU scheduler to determine a CPU time quota already consumed by the virtual CPU in the current CPU schedule period based on the recorded CPU time quota t1 and the hard disk read/write latency t; and an adjusting module 704 configured to adjust a system clock of the virtual machine based on the determined CPU time quota already consumed by the virtual CPU in the current CPU schedule period.

According to one embodiment of the present invention, the predicting module 702 is further configured to: determine that the hard disk read/write request belongs to a hard disk read/write request that would not occur in the target environment, and to predict that, in the target environment, the hard disk read/write latency t corresponding to the hard disk read/write request is equal to 0.

According to one embodiment of the present invention, the recording module 701 is further configured to notify the virtual CPU scheduler to cause the virtual CPU to suspend its work; the predicting module is further configured to cause the suspended virtual CPU to resume its work; and the determining module is further configured to notify the virtual CPU scheduler to set the CPU time quota already consumed by the virtual CPU in the current CPU schedule period to t1.

According to one embodiment of the present invention, the predicting module 702 is further configured to: determine that the hard disk read/write request belongs to a hard disk read/write request that would occur in a target environment, and to predict a hard disk read/write latency t corresponding to the hard disk read/write request in the target environment based on the time when the hard disk read/write processing is completed.

According to one embodiment of the present invention, the predicting module 702 is further configured to: notify the hard disk read/write latency t to the virtual CPU scheduler and notify the virtual CPU scheduler to cause the suspended virtual CPU to resume its work; and the determining module is further configured to set the CPU time quota already consumed by the virtual CPU in the current CPU schedule period to t+t1.

According to one embodiment of the present invention, the predicting module 702 is further configured to: record a CPU time quota t2 already consumed by the virtual CPU in the current CPU schedule period; to determine that the hard disk read/write request belongs to a hard disk read/write request that would not occur in the target environment, and to predict that, in the target environment, the hard disk read/write latency t corresponding to the hard disk read/write request is equal to 0; and the determining module is further configured to determine a CPU time quota already consumed by the virtual CPU in the current CPU schedule period based on the recorded CPU time quotas t1, t2 already consumed by the virtual CPU in the CPU schedule period and the hard disk read/write latency t equal to 0. According to one embodiment of the present invention, the determining module 703 is further configured to notify the virtual CPU scheduler to set the CPU time quota already consumed by the virtual CPU in the current CPU schedule period to t2.

According to one embodiment of the present invention, the predicting module 702 is further configured to: record a CPU time quota t2 already consumed by the virtual CPU in the current CPU schedule period; to determine that the hard disk read/write request belongs to a hard disk read/write request that would occur in the target environment, and to predict the hard disk read/write latency t corresponding to the hard disk read/write request in the target environment based on the time when the hard disk read/write processing is completed; and the determining module 703 is further configured to notify the virtual CPU scheduler to determine a CPU time quota already consumed by the virtual CPU in the current CPU schedule period based on the recorded CPU time quotas t1, t2 already consumed by the virtual CPU and the hard disk read/write latency t. According to one embodiment of the present invention, the determining module 703 is further configured to: in response to t being less than or equal to (t2−t1), set the CPU time quota already consumed by the virtual CPU in the current CPU schedule period to t2; in response to t being greater than (t2−t1), set the CPU time quota already consumed by the virtual CPU in the current CPU schedule period to t1+t.

According to one embodiment of the present invention, wherein said determining that the hard disk read/write request belongs to a hard disk read/write request that would not occur in the target environment is performed as follows: obtaining a memory access request of the virtual machine; determining that the memory access request needs a physical machine of the virtual machine to perform a hard disk read/write operation; in response to determining that the memory access request needs the hard disk read/write operation to be performed in the target environment, marking the hard disk read/write request triggered by the memory access request in the physical machine of the virtual machine.

The specific implementation of each of the above modules is referred to the detailed description in the method of creating a software performance testing environment based on a virtual machine according to the embodiments of the present invention, which would not be detailed here one by one.

The present invention may be a system, method, and/or computer program product. The computer program product may comprise a computer readable storage medium, with computer readable program instructions enabling the processor to implement various aspects of the present invention embodied thereon.

The computer readable storage medium may be a tangible device that may retain and store instructions for use by an instruction execution device. The computer readable storage medium may be, for example, but not limited to, an electronic storage device, a magnetic storage device, an optical storage device, an electromagnetic storage device, a semiconductor storage device, or any suitable combination of the foregoing. More specific examples of the computer readable storage medium (in a non-exhaustive list) includes: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It would be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, when executed by the processor of the computer or other programmable data processing apparatus, create means for implementing the functions/actions as specified in one or more blocks in the flowchart and/or block diagram. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the functions/actions as specified in one or more blocks in the flowchart and/or block diagram.

The computer readable program instructions may also be loaded onto a computer, other programmable data processing apparatus, or other device to cause a series of operational steps to be performed on the computer, other programmable apparatus or other device to produce a computer implemented process, such that the instructions which are executed on the computer, other programmable apparatus, or other device implement the functions/actions as specified in one or more blocks in the flowchart and/or block diagram.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It would also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations would be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for creating a software performance testing environment on a virtual machine system, the virtual machine system running at least one virtual machine (VM) on a single hardware platform, the single hardware platform having a central processor unit (CPU) configured to simulate a target environment on which software is to be run, said method comprising:

obtaining, at the CPU, a hard disk read/write request triggered by a virtual CPU of the virtual machine, and in response to obtaining said triggered request, notifying a virtual CPU scheduler to record a CPU time duration $t1$ already consumed by the virtual CPU in a current CPU schedule period, said time duration $t1$ having a corresponding physical CPU processing time consumed by the VM;

in response to detecting completion of hard disk read/write processing corresponding to the hard disk read/write request, predicting, by the CPU, a hard disk read/write latency t corresponding to the hard disk read/write request in a target environment, said latency t based a time when the hard disk read/write processing is completed;

notifying, by the CPU, the virtual CPU scheduler to determine a CPU processing time already consumed by the virtual CPU in the current CPU schedule period based on the recorded CPU time duration $t1$ and the predicted hard disk read/write latency t; and adjusting, by the CPU, a system clock of the virtual machine forward based on the determined CPU processing time already consumed by the virtual CPU in the current CPU schedule period, wherein in response to said detecting completion of hard disk read/write processing corresponding to the hard disk read/write request, said predicting a hard disk read/write latency t corresponding to the hard disk read/write request in a target environment comprises:

determining that the hard disk read/write request belongs to a hard disk read/write request that would not occur in the target environment, and predicting that, in the target environment, the hard disk read/write latency t corresponding to the hard disk read/write request is equal to 0, wherein the determining that the hard disk read/write request belongs to a hard disk read/write request that would not occur in the target environment comprises:

determining from the memory access request a virtual memory address of the content to be accessed, querying a virtual memory address mapping table maintained by a memory manager to determine, whether the virtual memory address is mapped to the physical memory address of the virtual machine system; and if determined that the virtual memory address is not mapped to the physical memory address of the virtual machine system, it is determined that the memory access request needs the physical machine for the virtual machine to perform the hard disk read/write operation; and wherein in response to obtaining a hard disk read/write request triggered by a virtual CPU of the virtual machine, and said notifying a virtual CPU scheduler to record a CPU time duration t1 already consumed by the virtual CPU in a current CPU schedule period comprises:

notifying the virtual CPU scheduler to cause the virtual CPU to suspend its work; and wherein said determining that the hard disk read/write request belongs to a hard disk read/write request that would not occur in the target environment, and predicting that, in the target environment, the hard disk read/write latency t corresponding to the hard disk read/write request is equal to 0 further comprises:

notifying the virtual CPU scheduler to cause the suspended virtual CPU to resume its work;

wherein said notifying the virtual CPU scheduler to determine a CPU processing time already consumed by the virtual CPU in the current CPU schedule period based on the recorded CPU time duration t1 and the hard disk read/write latency t comprises:

notifying the virtual CPU scheduler to set the CPU processing time already consumed by the virtual CPU in the current CPU schedule period to t1.

2. The method according to claim 1, wherein said in response to detecting completion of hard disk read/write processing corresponding to the hard disk read/write request, predicting a hard disk read/write latency t corresponding to the hard disk read/write request in a target environment comprises: determining, by said CPU, that the hard disk read/write request belongs to a hard disk read/write request that would occur in the target environment, and predicting the hard disk read/write latency t corresponding to the hard disk read/write request in the target environment based on a time when the hard disk read/write processing is completed, wherein said determining that the hard disk read/write request belongs to a hard disk read/write request that would occur in the target environment comprises:

determining from the memory access request a virtual memory address of the content to be accessed, querying a virtual memory address mapping table of the target environment maintained in a virtual machine manager to determine whether the virtual memory address is mapped to the physical memory address of the target environment; and if the virtual memory address is mapped to the physical memory address of the target environment, it is determined that the memory access request does need the hard disk read/write operation to be performed in the target environment.

3. The method according to claim 1, wherein said determining that the hard disk read/write request belongs to a hard disk read/write request that would occur in the target environment, and predicting a hard disk read/write latency t corresponding to the hard disk read/write request in the target environment further comprises: notifying the hard disk read/write latency t to the CPU scheduler and notifying the virtual CPU scheduler to cause the suspended virtual CPU to resume its work;

wherein said determining a CPU processing time already consumed by the virtual CPU in the current CPU schedule period based on the recorded CPU time duration t1 and the hard disk read/write latency t comprises:

setting the CPU processing time already consumed by the virtual CPU in the current CPU schedule period to t+t1.

4. The method according to claim 1, wherein said in response to detecting completion of hard disk read/write processing corresponding to the hard disk read/write request, predicting a hard disk read/write latency t corresponding to the hard disk read/write request in a target environment comprises: recording a CPU time duration t2 already consumed by the virtual CPU in the current CPU schedule period; determining that the hard disk read/write request belongs to a hard disk read/write request that would not occur in the target environment, and predicting that, in the target environment, the hard disk read/write latency t corresponding to the hard disk read/write request is equal to 0;

wherein said notifying the virtual CPU scheduler to determine a CPU processing time already consumed by the virtual CPU in the current CPU schedule period based on the recorded CPU time quota t1 and the hard disk read/write latency t comprises:

notifying the virtual CPU scheduler to determine a CPU processing time already consumed by the virtual CPU in the current CPU schedule period based on the recorded CPU time durations t1, t2 already consumed by the virtual CPU in the CPU schedule period and the hard disk read/write latency t equal to 0.

5. The method according to claim 4, wherein said notifying the virtual CPU scheduler to determine a CPU processing time already consumed by the virtual CPU in the current CPU schedule period based on the recorded CPU time durations t1, t2 already consumed by the virtual CPU in the CPU schedule period and the hard disk read/write latency t equal to 0 comprises: notifying the virtual CPU scheduler to set the CPU processing time already consumed by the virtual CPU in the current CPU schedule period to t2.

6. The method according to claim 2, wherein said in response to detecting completion of hard disk read/write processing corresponding to the hard disk read/write request, predicting a hard disk read/write latency t corresponding to the hard disk read/write request in a target environment comprises: recording a CPU time duration t2 already consumed by the virtual CPU in the current CPU schedule period; determining that the hard disk read/write request belongs to a hard disk read/write request that would occur in the target environment, and predicting the hard disk read/write latency t corresponding to the hard disk read/write request in the target environment based on the time when the hard disk read/write processing is completed;

wherein said notifying the virtual CPU scheduler to determine a CPU processing time already consumed by the virtual CPU in the current CPU schedule period based on the recorded CPU time duration t1 already consumed by the virtual CPU in the CPU schedule period and the hard disk read/write latency t comprises: notifying the virtual CPU scheduler to determine a CPU processing time already consumed by the virtual CPU in the current CPU schedule period based on the recorded CPU time durations t1, t2 already consumed by the virtual CPU and the hard disk read/write latency t.

7. The method according to claim 6, wherein said determining a CPU processing time already consumed by the virtual CPU in the current CPU schedule period based on the recorded CPU time durations t1, t2 already consumed by the virtual CPU and the hard disk read/write latency t comprises:

- in response to t being less than or equal to (t2−t1), setting the CPU processing time already consumed by the virtual CPU in the current CPU schedule period to t2; and
- in response to t being greater than (t2−t1), setting the CPU processing time already consumed by the virtual CPU in the current CPU schedule period to t1+t.

8. The method according to claim 1, wherein said determining that the hard disk read/write request belongs to a hard disk read/write request that would not occur in the target environment is performed as follows: obtaining a memory access request of the virtual machine; determining that the memory access request needs a physical machine of the virtual machine to perform a hard disk read/write operation; in response to determining that the memory access request needs the hard disk read/write operation to be performed in the target environment, marking the hard disk read/write request triggered by the memory access request in the physical machine of the virtual machine.

* * * * *